(12) United States Patent
Naidu et al.

(10) Patent No.: US 11,249,857 B2
(45) Date of Patent: Feb. 15, 2022

(54) METHODS FOR MANAGING CLUSTERS OF A STORAGE SYSTEM USING A CLOUD RESIDENT ORCHESTRATOR AND DEVICES THEREOF

(71) Applicant: NetApp, Inc., Sunnyvale, CA (US)

(72) Inventors: Abhishek Naidu, Sunnyvale, CA (US); Ravindra Kuramkote, Sunnyvale, CA (US); Paul Ngan, Sunnyvale, CA (US); Paul Yuedong Mu, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 125 days.

(21) Appl. No.: 16/392,371

(22) Filed: Apr. 23, 2019

(65) Prior Publication Data

US 2020/0125454 A1    Apr. 23, 2020

Related U.S. Application Data

(60) Provisional application No. 62/748,121, filed on Oct. 19, 2018.

(51) Int. Cl.
| | |
|---|---|
| *G06F 11/14* | (2006.01) |
| *H04L 41/0816* | (2022.01) |
| *H04L 49/00* | (2022.01) |
| *H04L 29/06* | (2006.01) |
| *H04L 67/1097* | (2022.01) |

(52) U.S. Cl.
CPC ...... *G06F 11/1464* (2013.01); *G06F 11/1451* (2013.01); *H04L 41/0816* (2013.01); *H04L 49/30* (2013.01); *H04L 63/0236* (2013.01); *H04L 63/0807* (2013.01); *H04L 63/10* (2013.01); *H04L 63/126* (2013.01); *H04L 63/166* (2013.01); *H04L 67/1097* (2013.01); *G06F 2201/815* (2013.01); *G06F 2201/84* (2013.01); *H04L 63/20* (2013.01)

(58) Field of Classification Search
CPC ..... G06F 8/60; G06F 8/61; G06F 8/63; G06F 11/1451; G06F 2201/84
USPC ....................................................... 707/649
See application file for complete search history.

(56) References Cited

U.S. PATENT DOCUMENTS

| | | |
|---|---|---|
| 9,558,204 B2 | 1/2017 | Leong et al. |
| 2004/0205048 A1 | 10/2004 | Pizzo et al. |
| 2010/0223396 A1 | 9/2010 | Bhootada et al. |
| 2011/0126003 A1 | 5/2011 | Engert |
| 2016/0132310 A1* | 5/2016 | Koushik ............ G06F 8/61 717/176 |
| 2016/0191672 A1 | 6/2016 | Perlman |
| 2018/0341666 A1 | 11/2018 | Lee et al. |

(Continued)

*Primary Examiner* — Hung T Vy
(74) *Attorney, Agent, or Firm* — Troutman Pepper Hamilton Sanders LLP (Rochester)

(57) ABSTRACT

Methods, non-transitory computer readable media, and computing devices that manages clusters of a storage system using a cloud resident orchestrator includes receiving an application programming interface (API) request from a volume manager device associated with storage volumes. Control messages in a queue intended for the storage volumes are identified. A message processing operation for each of the identified control messages is determined. The determined message processing operation is performed using the volume manager device associated with storage volumes.

20 Claims, 3 Drawing Sheets

(56) References Cited

U.S. PATENT DOCUMENTS

2019/0124141 A1\* 4/2019 Waltz ...................... G06F 16/27
2019/0370128 A1\* 12/2019 Sadavarte ........... G06F 11/0757

\* cited by examiner

METHODS FOR MANAGING CLUSTERS OF A STORAGE SYSTEM USING A CLOUD RESIDENT ORCHESTRATOR AND DEVICES THEREOF

This application claims the benefit of Provisional Patent Application Ser. No. 62/748,121 filed Oct. 19, 2018, which is hereby incorporated by reference in its entirety.

FIELD

This technology relates to managing storage system, and particularly relates to managing clusters of a storage system using a cloud resident orchestrator, and devices thereof.

BACKGROUND

Prior technologies typically require direct connections between storage systems for data management. However, as the number of storage systems increases, the system topology multiplies, making it more difficult to configure and manage the storage systems. Additionally, the performance of these storage systems is often negatively impacted from the need to manage these direct connections which often require a lot of processing cycles.

DETAILED DESCRIPTION

Figure 1:
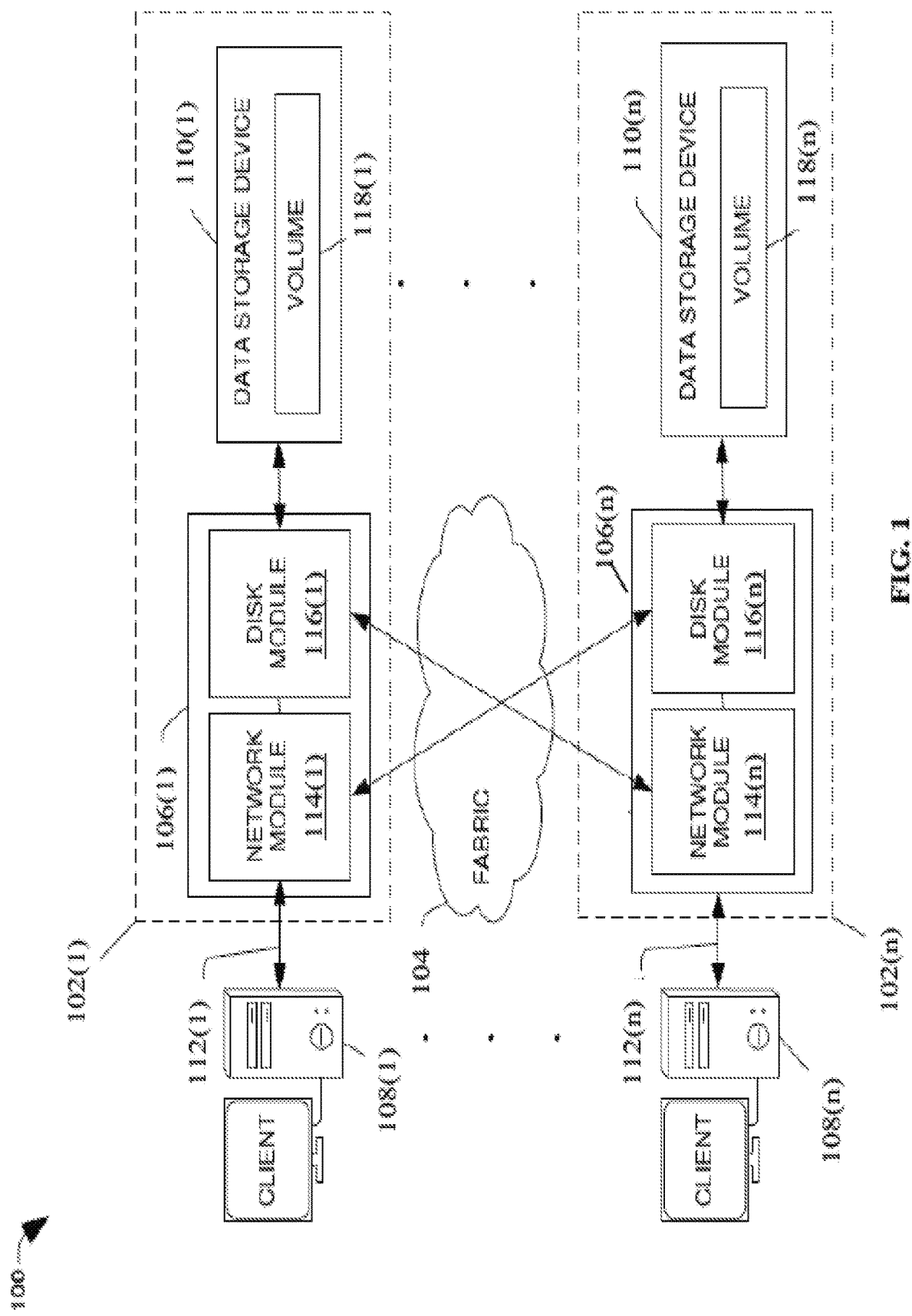
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and devices that allows managing clusters of a storage system using a cloud resident orchestrator.

In this example, node computing devices 106(1)-106(n) can be primary or local storage controllers or secondary or remote storage controllers that provide client devices 108(1)-108(n), with access to data stored within data storage devices 110(1)-110(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices used for storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-

114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) and server devices 109(1)-109(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118(1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters.

In one example, to facilitate access to data stored on the disks or other structures of the data storage device 110(1)-110(n), a file system (e.g., write anywhere file system) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
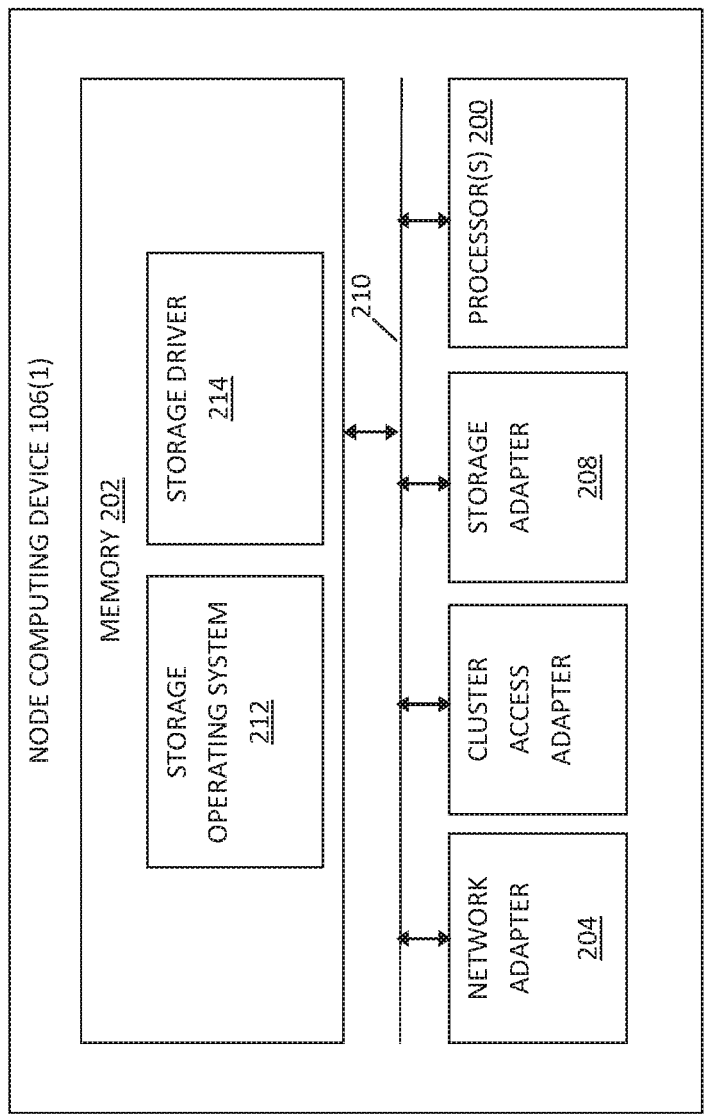
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIG. 3, for example.

The network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIG. 3.

Figure 3:
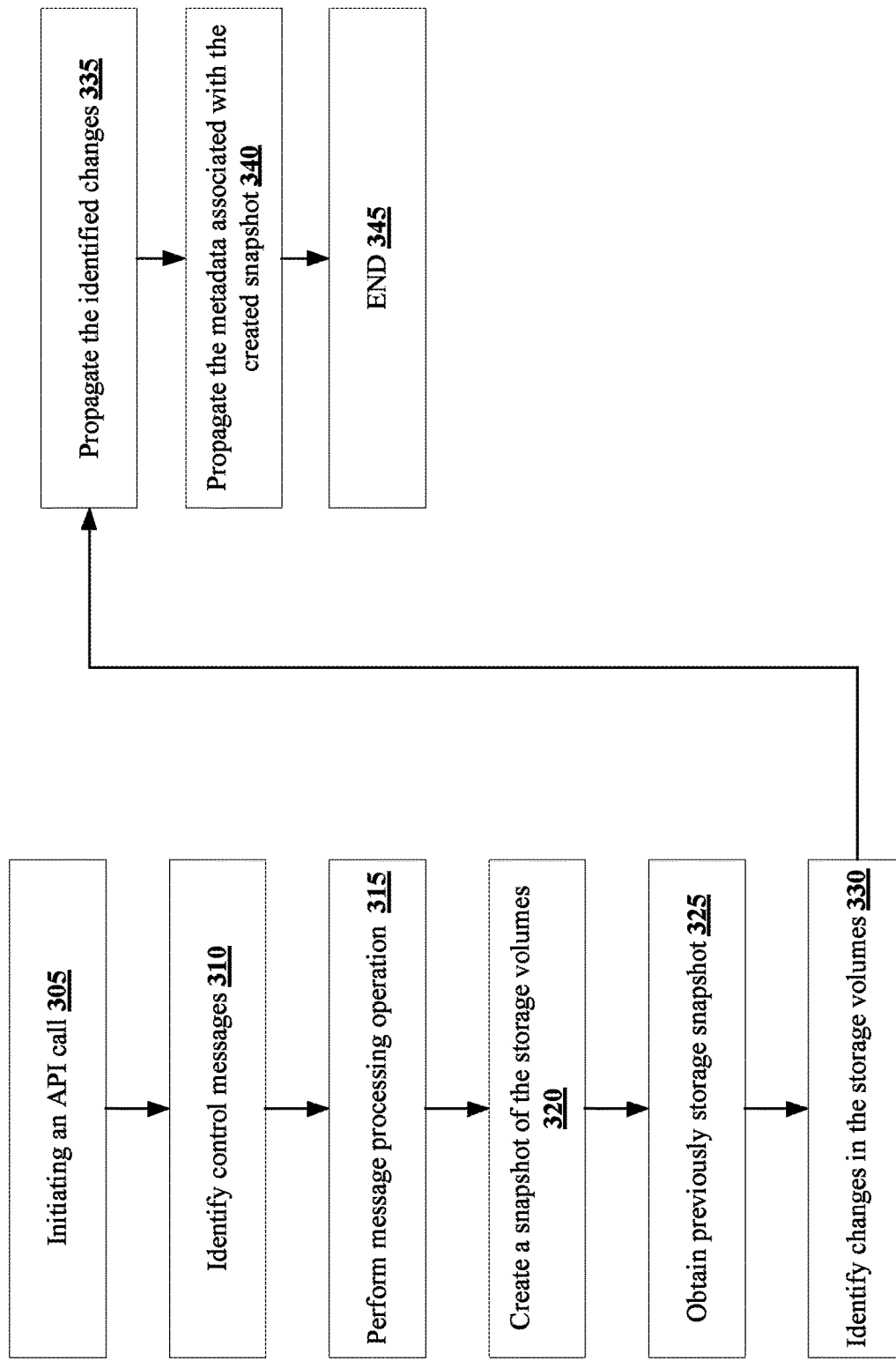
FIG. 3 is a flowchart of an exemplary method for managing clusters of a storage system using a cloud resident orchestrator.

An exemplary method for managing clusters of a storage system using a cloud resident orchestrator will now be illustrated with reference to FIG. 3. In this example, the CRO manages data protection workflows between primary and secondary volumes and ensures access control or data security associated with the storage volumes. In step 305, the node computing device 106(1) receives an application programming interface (API) request from a cloud resident orchestrator (CRO) (also called a volume manager device) associated with one or more of the resident volumes. Also in this example, the node computing device 106(1) can also register new volumes within the cluster prior to initiating the API call.

In step 310, the node computing device 106(1) identifies one or more messages present within the queue of the node computing device for the one or more resident volumes, although the queue can be present within the one or more resident volumes. Alternatively, the node computing device 106(1) can identify the one or more messages present within the queue for the clusters including the one or more resident volumes. In this example, the messages within the queue are in a Javascript Object Notation format (JSON) format, although the messages can be in other formats.

In step 315, the node computing device 106(1) performs a message processing operation on each of the identified one or more messages. By way of example, when the identified message is a notification or a response, then the node computing device 106(1) can perform the message processing operation by forwarding it to the cloud resident orchestrator associated with the resident volume or the cluster that the message was intended to, although the node computing device 106(1) can perform any other necessary action to the notification or the response message. In another example, if the identified message is a request, then the node computing device 106(1) performs the message processing operation by moving the identified request message to an outbound queue and then forwards it to the cloud resident orchestrator corresponding volume or the cluster for further processing.

In step 320, the node computing device 106(1) creates a snapshot of identified one or more volumes, although the node computing device 106(1) can create a snapshot of the one or more clusters including the identified one or more volumes. By creating a snapshot, the node computing device 106(1) is able to identify the current state of the storage within the identified one or more volumes.

In step 325, the node computing device 106(1) obtains a previously stored snapshot of the identified one or more volumes from the memory, although the node computing device 106(1) can obtain the snapshot from other memory locations. In this example, the previously stored snapshot includes the previous state of the storage of the identified one or more volumes or the clusters including the identified one or more volumes.

In step 330, the node computing device 106(1) compares the snapshot created in step 320 with the previously stored snapshot obtained in step 325 to identify one or more changes to the identified one or more volumes, although the node computing device 106(1) can use other techniques to identify the changes to the identified one or more volumes.

In step 335, the node computing device 106(1) propagates the identified one or more changes to the CRO associated with the identified one or more volumes. In this example, by propagating the identified one or more changes to the corresponding CRO, the node computing device 106(1) is able to configure a newly added volume or a cluster with the identified one or more changes.

In step 340, the node computing device 106(1) propagates the metadata of the created snapshot to the CRO associated with the identified one or more volumes, although the node computing device 106(1) can propagate the metadata of the created snapshot to the store cluster including the identified one or more volumes. By way of example, the metadata includes file attributes like the size of the file, creation time of the file, access time of the file, modification time of the file, name of the file although the metadata can include other types or amounts of information.

Accordingly, as illustrated and described by way of the examples herein, by using the CRO to communicate with the volumes or the cluster, the disclosed technology is able to avoid direct connections with the volumes or the clusters thereby reducing the complexity that arises when there are numerous volumes or clusters spread over geographical locations.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method, comprising:
    identifying, by a computing device, one or more storage volumes in response to an application programming interface (API) call over one or more communication networks from a volume manager device;
    determining, by the computing device, a message processing operation for one or more control messages in a stored inbound queue, wherein the one or more control messages are associated with the one or more storage volumes;
    comparing, by the computing device, a current snapshot of the one or more storage volumes with a previously-stored snapshot for the one or more storage volumes to identify one or more changes to the one or more storage volumes, wherein the one or more storage volumes are maintained on one or more data storage devices and store files and directories associated with a filesystem; and
    propagating, by the computing device, the one or more changes to the volume manager device via the one or more communication networks to facilitate performance of the message processing operation by the volume manager device.

2. The method as set forth in claim 1, further comprising creating, by the computing device, the current and previously-stored snapshots of the one or more storage volumes.

3. The method as set forth in claim 2, further comprising propagating, by the computing device, metadata associated with the created current snapshot to the volume manager device, wherein the metadata comprises one or more file attributes for one or more of the files that are associated with the one or more changes and stored in the one or more storage volumes.

4. The method as set forth in claim 1, wherein the one or more control messages are in a JavaScript Object Notation (JSON) format.

5. The method as set forth in claim 1, further comprising forwarding, by the computing device, the one or more control messages via the one or more communication networks to the volume manager device from a stored outbound queue after moving the one or more control messages to the outbound queue from the inbound queue.

6. The method as set forth in claim 1, wherein the one or more changes are broadcast in a compatible format.

7. A non-transitory machine readable medium having stored thereon instructions for managing clusters of a storage system comprising machine executable code which when executed by at least one machine causes the machine to:
    identify one or more storage volumes in response to an application programming interface (API) call over one or more communication networks from a volume manager device;

determine a message processing operation for one or more control messages in a stored inbound queue, wherein the one or more control messages are associated with the one or more storage volumes;

compare a current snapshot of the one or more storage volumes with a previously-stored snapshot for the one or more storage volumes to identify one or more changes to the one or more storage volumes, wherein the one or more storage volumes are maintained on one or more data storage devices and store files and directories associated with a filesystem; and propagate the one or more changes to the volume manager device via the one or more communication networks to facilitate performance of the message processing operation by the volume manager device.

8. The non-transitory machine readable medium as set forth in claim 7, wherein the machine executable code, when executed by the at least one machine, further causes the at least one machine to create the current and previously-stored snapshots of the one or more storage volumes.

9. The non-transitory machine readable medium as set forth in claim 8, wherein the machine executable code, when executed by the at least one machine, further causes the at least one machine to propagate metadata associated with the created current snapshot to the volume manager device, wherein the metadata comprises one or more file attributes for one or more of the files that are associated with the one or more changes and stored in the one or more storage volumes.

10. The non-transitory machine readable medium as set forth in claim 7, wherein the one or more control messages are in a JavaScript Object Notation (JSON) format.

11. The non-transitory machine readable medium as set forth in claim 7, wherein the machine executable code, when executed by the at least one machine, further causes the at least one machine to forward the one or more control messages via the one or more communication networks to the volume manager device from a stored outbound queue after moving the one or more control messages to the outbound queue from the inbound queue.

12. The non-transitory machine readable medium as forth in claim 7, wherein the one or more changes are broadcast in a compatible format.

13. A computing device, comprising:
a memory containing machine readable medium comprising machine executable code having stored thereon instructions for managing clusters of a storage system; and
a processor coupled to the memory, the processor configured to execute the machine executable code to cause the processor to:
identify one or more storage volumes in response to an application programming interface (API) call over one or more communication networks from a volume manager device;
determine a message processing operation for one or more control messages in a stored inbound queue, wherein the one or more control messages are associated with the one or more storage volumes;
compare a current snapshot of the one or more storage volumes with a previously-stored snapshot for the one or more storage volumes to identify one or more changes to the one or more storage volumes, wherein the one or more storage volumes are maintained on one or more data storage devices and store files and directories associated with a filesystem; and
propagate the one or more changes to the volume manager device via the one or more communication networks to facilitate performance of the message processing operation by the volume manager device.

14. The computing device as set forth in claim 13, wherein the processor is further configured to execute the machine executable code to further cause the processor to create the current and previously-stored snapshots of the one or more storage volumes.

15. The computing device as set forth in claim 13, wherein the one or more control messages are in a JavaScript Object Notation (JSON) format.

16. The computing device as set forth in claim 13, wherein the processor is further configured to execute the machine executable code to further cause the processor to forward the one or more control messages via the one or more communication networks to the volume manager device from a stored outbound queue after moving the one or more control messages to the outbound queue from the inbound queue.

17. The computing device as set forth in claim 13, wherein the one or more changes are broadcast in a compatible format.

18. The computing device as set forth in claim 13, wherein the processor is further configured to execute the machine executable code to further cause the processor to propagate metadata associated with the created current snapshot to the volume manager device, wherein the metadata comprises one or more file attributes for one or more of the files that are associated with the one or more changes and stored in the one or more storage volumes.

19. The computing device as set forth in claim 13, wherein the processor is further configured to execute the machine executable code to further cause the processor to obtain the previously-stored snapshot from the memory.

20. The computing device as set forth in claim 13, wherein the broadcast of the one or more changes facilitates creation by the volume manager device of a newly added volume with the one or more changes.

* * * * *